Sept. 24, 1963  W. E. WHITE  3,104,600
ROAD JOINT ASSEMBLY
Filed May 14, 1959  3 Sheets-Sheet 1

INVENTOR
William E. White
BY Natt M Emery Jr.
ATTORNEY

Sept. 24, 1963   W. E. WHITE   3,104,600
ROAD JOINT ASSEMBLY
Filed May 14, 1959   3 Sheets-Sheet 2
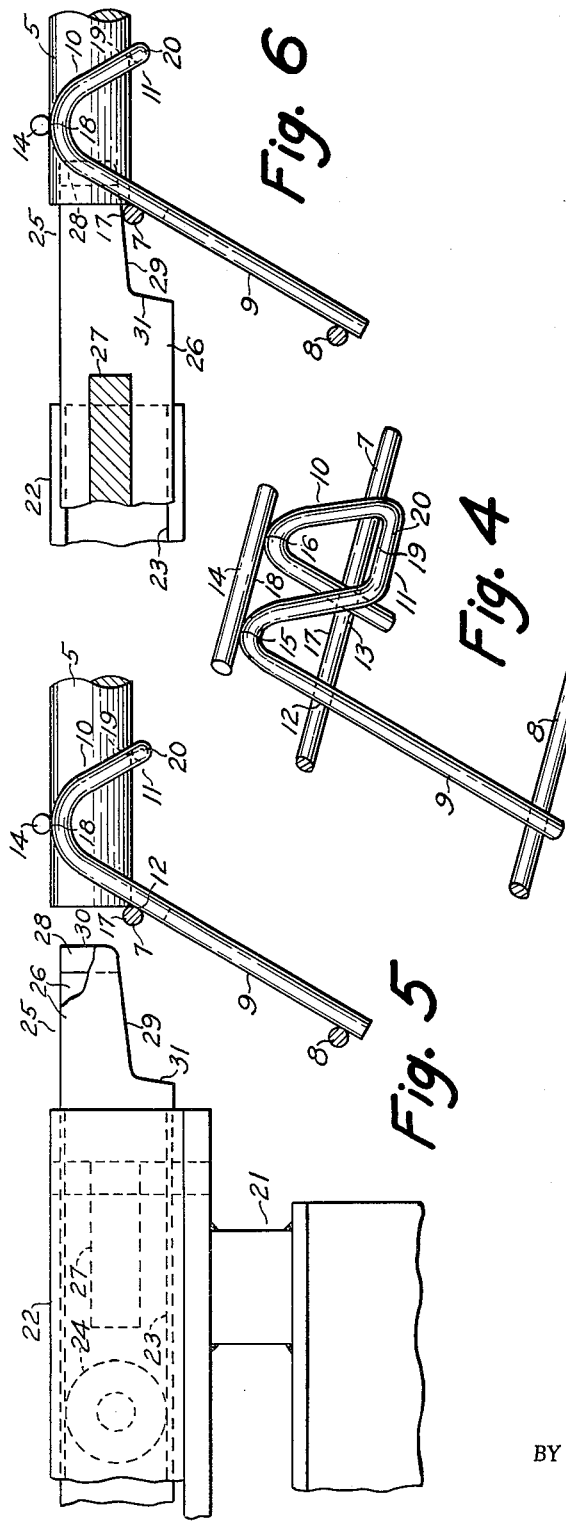
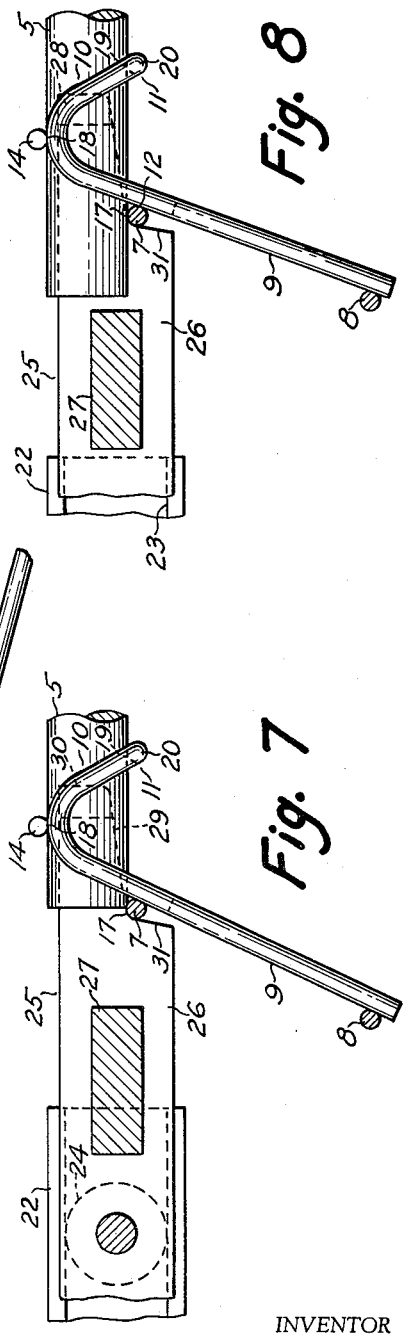
INVENTOR
William E. White
BY Natt M Emery Jr.
ATTORNEY Sept. 24, 1963 W. E. WHITE 3,104,600
ROAD JOINT ASSEMBLY
Filed May 14, 1959 3 Sheets-Sheet 3
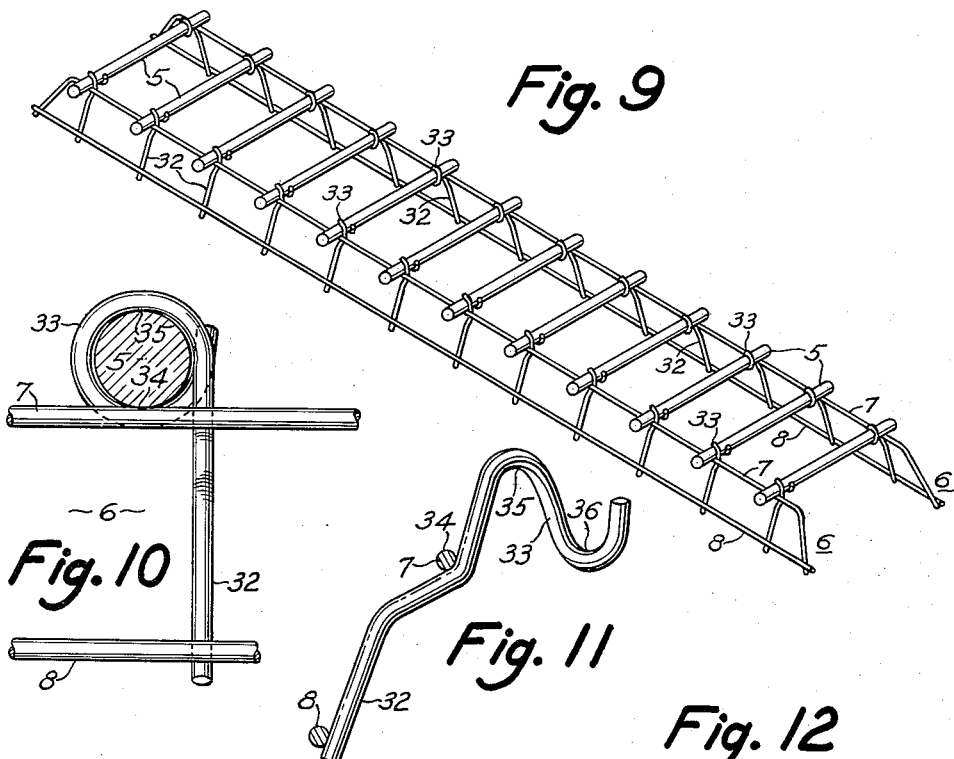
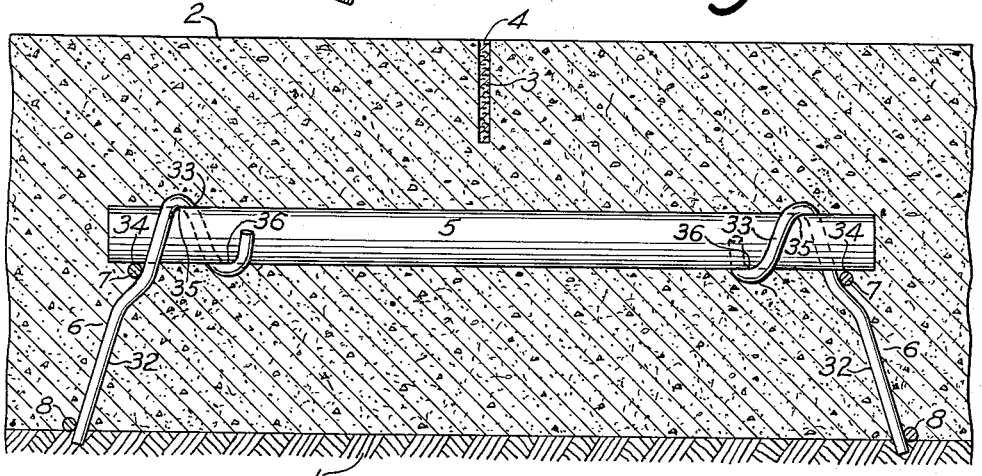
INVENTOR
William E. White
BY Natt M Emery Jr.
ATTORNEY

United States Patent Office 3,104,600
Patented Sept. 24, 1963

3,104,600
ROAD JOINT ASSEMBLY
William E. White, Bethlehem, Pa., assignor to Bethlehem Steel Company, a corporation of Pennsylvania
Filed May 14, 1959, Ser. No. 813,203
1 Claim. (Cl. 94—8)

My invention relates to a fabricated dowel assembly which is especially adapted for transverse joints in concrete pavements for roads, airport runways, and the like.

One object of my invention is to provide a simple, strong, inexpensive, and conveniently nestable dowel supporting assembly for transverse joints.

Another object is to provide an assembly of this type which can be made without manual welding and will involve less labor cost in fabrication than prior dowel assemblies.

Another object is to provide a dowel assembly which will hold the dowels tightly clamped and in fully secure and accurate alignment without additional elements and despite vibration or rough handling in transportation or in manipulation by unskilled workers.

A further object is to provide power operated means for attaching supporting members to the dowels.

Additional objects, advantages and purposes of the invention will appear hereinafter in the specification and drawings, and in the appended claim.

In the drawings:

FIG. 4 is a detail view of one of the supporting legs and the associated clamping portion;

FIG. 5 is a diagrammatic side elevation of a portion of the pusher assembly in retracted position and showing a dowel end as inserted into the clamping portion before the application of pressure;

FIG. 6 is a view similar to FIG. 5, but with the pusher making its first contact with the upper longitudinal rod of the frame;

FIG. 7 is another side elevation showing the pusher in full engagement with the upper longitudinal rod;

FIG. 8 is a similar view showing the final forward position of the pusher;

FIG. 9 is a perspective view of a modification of the dowel assembly, having helical clamping portions;

FIG. 10 is a detail end view of said modification;

FIG. 11 is a detail view of a leg with helical clamping portion; and

FIG. 12 is a vertical section showing the modified dowel assembly in concrete at a joint.

Figure 1:
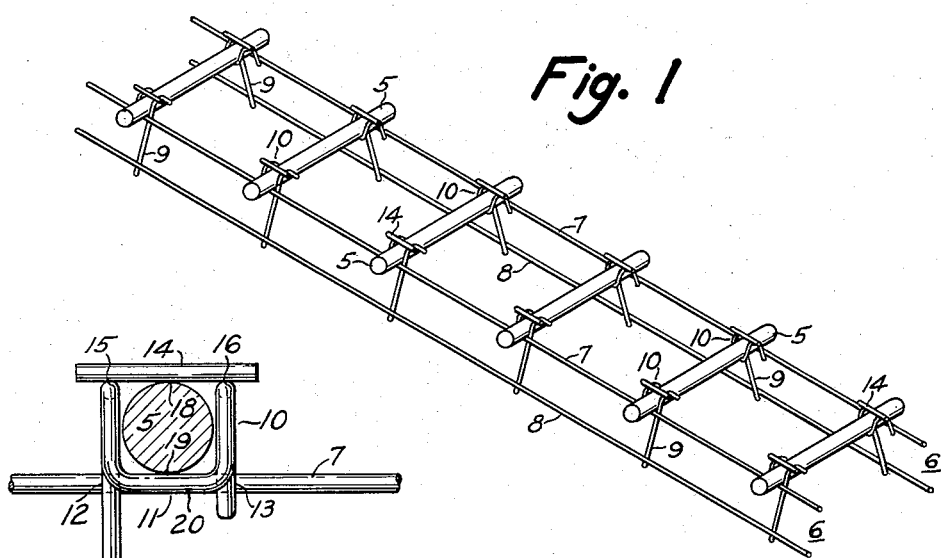
FIG. 1 is a perspective view of my improved dowel assembly.
Figure 2:
FIG. 2 is a detail end view including one of the dowels in section.
Figure 3:
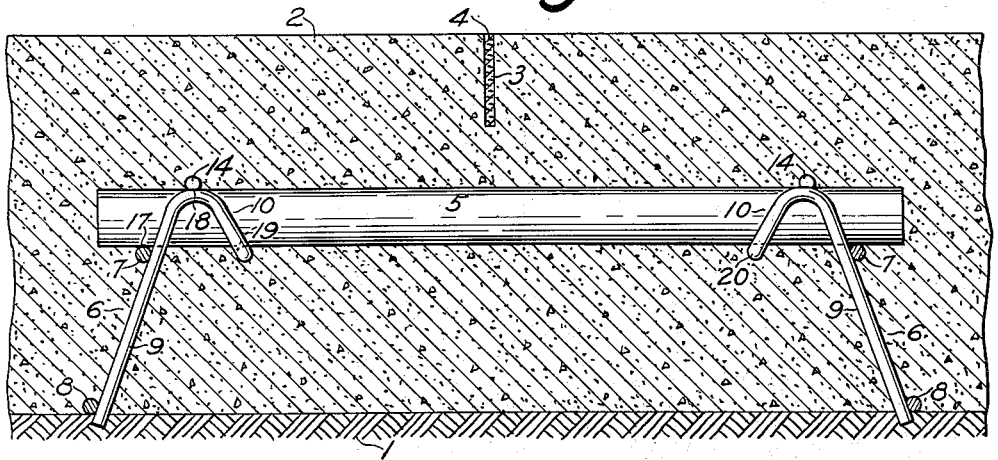
FIG. 3 is a vertical cross-sectional view through a transverse joint showing a dowel assembly in position in the concrete.

Referring in detail to the drawings, the reference numeral 1 indicates the subgrade upon which rests the concrete pavement 2 having a transverse groove 3 filled with conventional sealing material 4 on its upper surface. Cylindrical metal dowels 5 are supported in properly spaced position thereunder by opposed side frame elements 6.

Each of said side frame elements 6 comprises an upper longitudinal rod 7 and a lower longitudinal rod 8, disposed parallel to the subgrade, to which are welded at right angles and at regularly spaced longitudinal intervals a plurality of upwardly extending and inwardly inclined support legs 9 each having its upper end extended and formed into one of the inwardly extending clamping portions 10.

Said clamping portions 10 are substantially identical, and preferably are made before the individual legs are welded in place by bending the upper end of each leg 9 laterally and then downwardly to form a substantially U-shaped flat portion 11. A short horizontal top rod 14 is welded at 15 and 16 across said U-shaped portion 11, which is then bent rearwardly at an acute angle beneath the top rod 14, as shown in FIG. 4. In order to complete the clamping portion 10, each leg 9 is finally welded at 12 and 13 to the upper rod 7.

Said clamping portion 10 is dimensioned to create a tight frictional engagement with the dowel end at three points, said points being the upper surface 17 of the longitudinal rod 7, the inner surface 18 of the top short rod 14, and the upper surface 19 of the rear horizontal portion 20 of the U-shaped portion 11.

It will be observed that the space between the points 18 and 19 is normally somewhat larger than the diameter of the dowel, so that the frame may be initially hung without much effort on the dowel ends as in FIG. 5, but the space between the points 17 and 18 will be slightly smaller than the first-mentioned space before the dowel is attached, so that considerable downward pressure on the longitudinal rod 7 will be needed for it to pass the dowel end.

Frictional engagement with the dowel is accomplished by the application of a push-on force which initially is directed vertically downward, as by cam action, to bring the point 17 into a position relative to the lower surface of the dowel end which will permit further application of force horizontally to move the contacting points 17, 18 and 19 along the dowel to the desired distance from the extremity of the dowel.

The force required to press the dowel 5 into engagement with the side assembly may be supplied by any suitable fluid pressure or mechanical jacking means (not shown), in conjunction with a pusher device as shown in FIGS. 5 to 8 inclusive.

Such a pusher apparatus is comprised of suitable support members 21 on which are mounted elongated box shaped guides 22 having inner tracks 23 on which rollers 24 journaled on the pushers 25 will enable said pushers to be reciprocated freely. Each pusher 25 consists of a pair of horizontally extending bars 26 which are held in parallel spaced relation by welded cross-bars 27, being so arranged as to permit the bars 26 to be advanced together on opposite sides of a horizontally supported dowel 5. The forward end of each of said bars 26 has a beveled inner edge 28 and is notched or cut away at the bottom to provide a downwardly sloping lower face 29 intermediate between upper and lower vertical faces 30 and 31. It will be understood that a preferable form of the complete apparatus will include a series of coacting similar pushers 25 disposed at opposite ends of the dowels and adjacent two complete side frame elements 6.

In operating the above described pusher apparatus, the two side frame elements 6 are initially arranged horizontally with their clamping portions 10 resting on opposite ends of a series of parallel dowels 5, and with the lower edges of said dowels contacting an upper side portion of the upper longitudinal rods 7 and the legs 9 extending downwardly therefrom, as shown in FIG. 5. The pusher 25 is advanced upon both sides of the dowel 5, as in FIG. 6, and begins to depress the upper longitudinal rods 7. In FIG. 7 the lower vertical face 31 of the pusher is shown in full contact with the upper horizontal rod 7, and in FIG. 8 the clamping portion 10 has reached its final inward position on the dowel 5, after which the pusher 25 may be retracted.

The modified dowel assembly shown in FIGS. 9 to 12 inclusive has the upper end of each of its support legs 32 formed into an inwardly extending terminal helical portion 33 of larger internal diameter than the dowel but so placed in relation to the upper longitudinal rod 7 that the latter when forced downward and inward will create a similar clamping engagement of the dowel end between a leverage of three points, said points being the upper surface 34 of said rod 7 and the inner surfaces 35 and 36 at the top and bottom of the loop respectively. This may be pressed onto the dowel in the same manner and by the same apparatus as in FIGS. 5 to 8 above described.

When the clamping portions are properly proportioned with relation to the size of the dowels, the clamping action on both ends of each dowel will be sufficiently tight to permit ordinary rough handling and piling without any risk of dowels becoming loose or sliding out of the assembly, yet not too tight to prevent proper functioning under normal conditions of contraction and expansion as a highway joint. However, by pushing the inner end of the clamping portion on any dowel 5 forcibly against an upright and inwardly adjustable stop bar (not shown), it is a simple matter to compress or crimp together the ends of the clamping portion sufficiently to overcome the elastic limit of said clamping portion and to reduce its sliding friction on the dowel to any quantity desired. In this manner, it is also possible to have alternately loosely and tightly clamped dowel ends wherever such a joint arrangement may appear desirable or convenient.

It is additionally possible instead of bending the U-shaped portions 11 integrally from the leg 9, to weld several rods together to form substantially the same shape, and also to transpose the relative positions of the clamping points on the ends of the dowels, if this should be desired.

The dowel assembly as above disclosed is especially suitable for a contraction joint. However, by the addition of a conventional parting member (not shown) between the slabs, the dowel assembly will be equally satisfactory in an expansion joint.

Although I have thus described my invention in considerable detail, I do not wish to be limited narrowly to the exact and specific particulars disclosed, but I may also use such substitutes, modifications or equivalents as are included within the scope and spirit of the invention or pointed out in the appended claim.

I claim:

A dowel assembly comprising:
(a) a pair of spaced wire frames each comprising a longitudinally rod and a plurality of intersecting support wires secured thereto,
(b) the lower portion of each support wire serving as a ground engaging portion and the upper portion of each support wire extending above said longitudinal rods and inwardly inclined,
(c) each support wire having a terminal portion spaced laterally of said upper portion and secured to said longitudinal rod,
(d) that portion of the longitudinal rod between each support wire and its associated terminal portion forming a first dowel seat,
(e) the upper end of each upper support wire portion and its respective terminal portion being connected by an inwardly and downwardly inclined U-shaped portion,
(f) the bottom of said U being at the level of said longitudinal rod to form therewith a second dowel seat spaced from said first dowel seat,
(g) a short rod parallel to said longitudinal rod bridging the top of the legs of said U-shaped portion and secured thereto,
(h) dowel rods extending between opposed wire frames and seated in the opposite pairs of dowel seats,
(i) said dowel seats and said short bridging rods frictionally engaging the ends of said dowels therebetween for clamping engagement.

References Cited in the file of this patent
UNITED STATES PATENTS

| | | |
|---|---|---|
| 2,319,050 | Fischer | May 11, 1943 |
| 2,462,353 | Brickman | Feb. 22, 1949 |
| 2,495,649 | Wilson | Jan. 24, 1950 |
| 2,586,222 | Hamilton | Feb. 19, 1952 |
| 2,783,695 | De Canio | Mar. 5, 1957 |
| 2,864,289 | De Canio | Dec. 16, 1958 |